United States Patent Office 3,159,637
Patented Dec. 1, 1964

3,159,637
PROCESS FOR THE PREPARATION OF CYCLIC IMIDES
Jurgen Friedrich Falbe, Bonn, and Friedrich W. A. G. K. Korte, Hangelar, Germany, assignors to Shell Oil Company, New York, N.Y., a corporation of Delaware
No Drawing. Filed Oct. 4, 1962, Ser. No. 228,246
Claims priority, application Germany, Oct. 9, 1961,
S 76,194
4 Claims. (Cl. 260—281)

The invention relates to a process for preparing imides from unsaturated carboxylic acid amides.

It is known that acid amides are obtained by reacting carbon monoxide and ammonia or primary or secondary nonaromatic amines with olefins and olefinic compounds under pressure and at elevated temperature, under the influence of catalysts such as carbonyl-forming complex compounds or nickel, cobalt or iron salts, see British Patent No. 628,659.

Moreover, it is known to prepare oxo compounds, such as aldehydes, by reacting compounds having a double bond connecting two carbon atoms with a mixture of carbon monoxide and hydrogen under the influence of a carbonyl-forming metal catalyst, e.g., cobalt carbonyls.

It was therefore to be expected that by reacting acid amides having a double bond connecting two carbon atoms with a mixture of carbon monoxide and hydrogen under the influence of a carbonyl-forming metal compound as catalyst at elevated temperatures and pressures the corresponding oxo compounds, such as aldehydes of acid amides would be formed.

It has now been found that unsaturated carboxylic acid amides are converted with carbon monoxide at elevated temperatures and pressures in the presence of carbonyl-forming cobalt compounds to imides. For example, acrylamide is thus converted to succinimide.

It has also been found that with unbranched, unsaturated carboxylic acid amides containing a chain of more than 3 carbon atoms, such as crotonic acid amide, as well as with branched carboxylic acid amides containing more than 4 carbon atoms, such as $\beta,\beta$-dimethyl acrylamide, glutarimides are obtained in addition to succinimides. This may be attributable to double bond isomerization of the starting materials under the reaction conditions.

The reaction sets in even at a slightly elevated temperature and pressure, e.g., a temperature of 50° C. and a pressure of 30 atm. To keep the reaction time as short as possible, however, higher temperatures and pressures, such as temperatures in the range of from 150° to 300° C. and pressures between 150 and 340 atm. are preferred. In suitable autoclaves still higher temperatures and pressures, e.g., above 300° C. and 400 atm. may also be advantageously used, for instance up to 400° C. and 1000 to 2000 atm.

The catalysts used in the process are barbonyl-forming cobalt salts and cobalt compounds, such as dicobalt octacarbonyl, cobalt tetracarbonyl hydrogen, Raney cobalt, cobalt sulphate, cobalt acetate, cobalt naphthenate.

The process is preferably carried out in a solution with an inert liquid organic solvent. Particularly suitable solvents are non-reactive hydrocarbons and mixtures thereof, both acyclic and carbocyclic, especially liquid aromatic hydrocarbons such as benzene, toluene, the xylenes and methyl naphthalene and liquid saturated dialkyl ketones and alkyl aryl ketones such as acetone, methyl ethyl ketone, diethyl ketone and methyl phenyl ketone. The catalysts are added either without solvent or dissolved in one of the solvents referred to or a mixture thereof. Mixtures of aromatic hydrocarbon and ketone are especially useful. The catalyst concentration of the process according to the invention is preferably in the range of from 1 to 5%, based on the total portion of the carboxylic acid amides used, higher concentrations being capable of giving better yields in particular cases.

The unsaturated carboxylic acid amides starting materials include $\alpha,\beta$ unsaturated aliphatic (acyclic and alicyclic) carboxylic acid amides, such as acryl amide, methacryl amide, $\beta,\beta$ dimethyl acryl amide, 1-cyclohexene-1-carboxylic acid amide, propiolamide and croton amide and also $\beta,\lambda$ unsaturated carboxylic acid amide, such as cyclohexene acetic acid amide or $\alpha,\alpha$ dimethyl vinyl acetic acid amide. The unsaturated carboxylic acid amides may also contain aromatic groups as substituents. For example, cinnamic acid amide also reacts to give an excellent yield of alpha-phenyl succinimide. In addition the carboxylic acid amides may contain a substituent group, such as an alkyl, aryl, or aralkyl group linked to nitrogen, e.g., N-methyl acryl amide, N-butyl acryl amide, N-isobutyl acryl amide, N-hexyl acryl amide, N-lauryl acryl amide, acryl anilide, N-p-chlorophenyl acryl amide, N-benzyl acryl amide, N-2,6-dichlorophenyl acryl amide, N-n-butyl methacryl amide and N-benzyl methacryl amide.

If the starting materials used in the process of the invention are straight-chain carboxylic acid amides having more than 3 carbon atoms in a chain, such as crotonamide, or branched carboxylic acid amides having more than 4 carbon atoms, such as $\beta,\beta$ dimethyl acryl amide, glutarimides are obtained in addition to the corresponding substituted succinimides. In general, $\beta,\lambda$ unsaturated carboxylic acid amides, such as cyclohexene acetic acid amide, give glutaric acid imides.

The imides prepared by the process of the invention are not only valuable pharmaceutical materials, constituents of biocidal compositions or lubricants but also intermediate products for the preparation of special reagents, such as N-bromosuccinimide. Thus derivatives of succinimides act as antispasmodics. According to the British patent specification No. 728,994 N-aryl $\alpha,\alpha'$ dichlorosuccinimides have fungicidal properties. According to the French patent specification No. 1,265,784 long-chain substituted succinimides may be used as lubricants.

The invention will be illustrated by the following examples.

EXAMPLE I

*Succinimide From Acryl Amide (Catalyst $Co_2(CO)_8$)*

A quantity of 71 g. of acryl amide, stabilized by the addition of a small quantity of hydroquinone, 100 ml. of a benzene $Co_2(CO)_8$ solution (4 g. of cobalt, based on metal) and 300 ml. of acetone were introduced into a 1 liter magnetically operated double-acting agitating autoclave. Carbon monoxide was introduced until the pressure in the autoclave was 170 atm. and the autoclave heated to 200° C. After the required temperature had been reached carbon monoxide was again introduced until the final pressure was 306 atm. and stirring continued for 2½ hours. The autoclave was subsequently cooled, the excess carbon monoxide vented, the catalyst decomposition products removed by suction, the solvent distilled off in vacuo and the remaining product distilled in vacuo.

Yield: 80.5 g.=81% of theory.
Boiling point (0.04 mm.): 127–139° C.
Melting point: 125° C. (from butanol petroleum ether or acetic acid ester)
IR carbonyl bonds: 1688 cm.$^{-1}$, 1768 cm.$^{-1}$
NH bonds: 3455 cm.$^{-1}$

*Analysis.*—Calculated: C=48.48; H=5.09; N=14.14.
Found: C=48.69; H=4.74; N=14.85.

The same experiment was made with different catalysts and gave the following yields:

Raney cobalt: 54% of theory
Cobalt acetate: 21% of theory

EXAMPLE II

*N-Methylsuccinimide From N-Methyl Acryl Amide*

Procedure as in Example I.

Starting materials: 23 g. of N-methyl acryl amide (stabilized by addition of some hydroquinone)—

75 ml. of acetone
    25 ml. of benzene $Co_2(CO)_8$ solution

Reaction conditions:
    Initial pressure: 200 atm. CO
    Final pressure: 279 atm.
    Temperature: 200° C.
    Reaction time: 4 hours Yield: 19.7 g.=64.5% of theory (conversion=100%).

Boiling point (15 mm.): 125–128° C.
Melting point: 69° C. (from ligroin or diethylether).
IR carbonyl bonds: 1685 cm.$^{-1}$, 1760 cm.$^{-1}$

*Analysis.*—Calculated: C=53.09; H=6.24; N=12.38. Found: C=52.74; H=6.37; N=12.42.

EXAMPLE III

*N-Butylsuccinimide From N-Butyl Acryl Amide*

Procedure as in Example I.

Starting materials: 71.3 g. of N-butyl acryl amide (stabilized by addition of some hydroquinone)—

150 ml. of acetone,
    60 ml. of benzene $Co_2(CO)_8$ solution

Reaction conditions:
    Initial pressure: 170 atm. CO
    Final pressure: 311 atm.
    Temperature: 200° C.
    Reaction time: 8 hours Yield: 62.7 g.=77% of theory.

Boiling point (12 mm.): 138° C.
$n_{20}$=1.4736
IR carbonyl bonds: 1698 cm.$^{-1}$, 1767 cm.$^{-1}$

*Analysis.*—Calculated: C=61.91; H=8.44; N=9.03. Found: C=62.14; H=8.56; N=9.19.

EXAMPLE IV

*N-Isobutylsuccinimide From N-isobutyl Acryl Amide*

Procedure as in Example I.

Starting materials: 82 g. of N-isobutyl acryl amide (stabilized by addition of some hydroquinone)—

250 ml. of acetone
    100 ml. of benzene $Co_2(CO)_8$ solution

Reaction conditions:
    Initial pressure: 170 atm. CO
    Final pressure: 305 atm.
    Temperature: 200° C.
    Reaction time: 6 hours Yield: 80.1 g.=80% of theory.

Boiling point (17 mm.): 132° C.
$n_{20}$=1.4696
IR carbonyl bonds: 1700 cm.$^{-1}$, 1765 cm.$^{-1}$

*Analysis.*—Calculated: C=61.91; H=8.44; N=9.03. Found: C=62.40; H=9.06; N=9.00.

EXAMPLE V

*N-Hexylsuccinimide From N-Hexyl Acryl Amide*

Procedure as in Example I.

Starting materials: 58 g. of N-hexyl acryl amide (stabilized by addition of some hydroquinone)—

200 ml. of acetone
    50 ml. of benzene $Co_2(CO)_8$ solution

Reaction conditions:
    Initial pressure: 100 atm. CO
    Final pressure: 268 atm.
    Temperature: 200° C.
    Reaction time: 6 hours Yield: 68.5 g.=76.8% of theory.

Boiling point (13 mm.): 158° C.
$n_{20}$=1.4718
IR carbonyl bonds: 1702 cm.$^{-1}$, 1768 cm.$^{-1}$

*Analysis.*—Calculated: C=65.54; H=9.35; N=7.64. Found: C=65.50; H=9.53; N=7.45.

EXAMPLE VI

*N-Laurylsuccinimide From N-Lauryl-Acryl Amide*

Procedure as in Example I.

Starting materials: 56 g. of N-lauryl acryl amide (stabilized by addition of some hydroquinone)—

250 ml. of acetone
    25 ml. of benzene $Co_2(CO)_8$ solution

Reaction conditions:
    Initial pressure: 185 atm. CO
    Final pressure: 271 atm.
    Temperature: 200° C.
    Reaction time: 4 hours Yield: 34.3 g.=54.7% of theory.

Boiling point (0.04 mm.): 130–156° C.
Melting point: 38–42° C. (from petroleum ether 40/60)
IR carbonyl bonds: 1687 cm.$^{-1}$, 1763 cm.$^{-1}$

*Analysis.*—Calculated: C=71.86; H=10.93; N=5.24. Found: C=71.53; H=11.51; N=5.67.

EXAMPLE VII

*N-Phenylsuccinimide From Acryl Anilide*

Procedure as in Example I.

Starting materials: 71.5 g. of acryl anilide (stabilized by addition of some hydroquinone)—

300 ml. of methyl ethyl ketone
    50 ml. of benzene $Co_2(CO)_8$ solution

Reaction conditions:
    Initial pressure: 170 atm. CO
    Final pressure: 297 atm.
    Temperature: 240° C.
    Reaction time: 5½ hours Yield: 54.8 g.=64.3% of theory (100% gross yield).

Melting point: 157° C. (from methanol)
IR carbonyl bonds: 1700 cm.$^{-1}$, 1770 cm.$^{-1}$

*Analysis.*—Calculated: C=68.56; H=5.18; N=8.00. Found: C=68.59; H=5.39; N=7.80.

EXAMPLE VIII

*N-Benzylsuccinimide From N-Benzyl Acryl Amide*

Procedure as in Example I.

Starting materials: 63 g. of N-benzyl acryl amide (stabilized by the addition of some hydroquinone)—

350 ml. of acetone
    40 ml. of benzene $Co_2(CO)_8$ solution

Reaction conditions:
    Initial pressure: 170 atm. CO
    Final pressure: 272 atm.
    Temperature: 240° C.
    Reaction time: 4 hours Yield: 67.7 g.=91.7% of theory.

Melting point: 104° C. (from diethyl ether)
IR carbonyl bonds: 1700 cm.$^{-1}$, 1769 cm.$^{-1}$

*Analysis.*—Calculated: C=69.82; H=5.86; N=7.40. Found: C=70.22; H=6.13; N=7.56.

EXAMPLE IX

*N-2,6-Dichlorophenyl Succinimide From N-2,6-Dichloro-Phenyl Acryl Amide*

Procedure as in Example I.
Starting materials: 50 g. of N-2,6-dichlorophenyl acryl amide (stabilized by the addition of some hydroquinone)—

250 ml. of acetone
    33 ml. of benzene $Co_2(CO)_8$ solution

Reaction conditions:
    Initial pressure: 170 atm. CO
    Final pressure: 309 atm.
    Temperature: 240° C.
    Reaction time: 3 hours Yield: 25 g.=45% of theory.

Melting point: 150° C. (from methanol/acetone)
IR carbonyl bonds: 1720 cm.$^{-1}$, 1780 cm.$^{-1}$.

*Analysis.*—Calculated: C=49.09; H=2.84; N=5.74; Cl=29.05. Found: C=48.27; H=2.97; N=5.47; Cl=28.61.

EXAMPLE X

*α-Methyl Succinimide From Methacryl Amide*

Procedure as in Example I.
Starting materials: 92 g. of methacryl amide (stabilized by the addition of some hydroquinone)—

1000 ml. of acetone
    125 ml. of benzene $Co_2(CO)_8$ solution

Reaction conditions:
    Initial pressure: 180 atm. CO
    Final pressure: 300 atm.
    Temperature: 240° C.
    Reaction time: 5 hours Yield: 83.5 g.=68% of theory.

Boiling point (0.2 mm.): 92° C.
Melting point: 65° C.
IR carbonyl bonds: 1700 cm.$^{-1}$, 1760 cm.$^{-1}$

*Analysis.*—Calculated: C=53.09; H=6.24; N=12.38. Found: C=53.92; H=6.52; N=12.41.

EXAMPLE XI

*N-n-Butyl-α-Methyl-Succinimide From N-n-Butyl Methacryl Amide*

Procedure as in Example I.
Starting materials: 95 g. of N-n-butyl methacryl amide (stabilized by the addition of some hydroquinone)—

300 ml. of acetone
    100 ml. of benzene $Co_2(CO)_8$ solution

Reaction conditions:
    Initial pressure: 185 atm. CO
    Final pressure: 300 atm.
    Temperature: 200° C.
    Reaction time: 4 hours Yield: 84.3 g.=73.6% of theory.
Boiling point (12 mm.): 131° C.
$n_{20}$=1.4620
IR carbonyl bonds: 1700 cm.$^{-1}$, 1770 cm.$^{-1}$

*Analysis.*—Calculated: C=63.88; H=8.94; N=8.28. Found: C=64.62; H=9.40; N=9.19.

EXAMPLE XII

*N-Benzyl-α-Methyl-Succinimide From N-Benzyl Methacryl Amide*

Procedure as in Example I.
Starting materials: 50 g. of N-benzyl methacryl amide (stabilized by the addition of some hydroquinone)—

300 ml. of benzene
    100 ml. of benzene $Co_2(CO)_8$ solution

Reaction conditions:
    Initial pressure: 155 atm. CO
    Final pressure: 300 atm.
    Temperature: 280° C.
    Reaction time: 5 hours Yield: 44.7 g.=77% of theory.

Boiling point (0.15 mm.): 123–125° C.
$n_{20}$=1.5400
IR carbonyl bonds: 1705 cm.$^{-1}$, 1770 cm.$^{-1}$

*Analysis.*—Calculated: C=70.91; H=6.45; N=6.89. Found: C=71.39; H=7.21; N=7.21.

EXAMPLE XIII

*Methyl Succinimide and Glutarimide From Croton Amide*

Procedure as in Example I.
Starting materials: 127.2 g. of croton amide (stabilized by the addition of some hydroquinone)—

300 ml. of acetone
    150 ml. of benzene $Co_2(CO)_8$ solution

Reaction conditions:
    Initial pressure: 170 atm. CO
    Final pressure: 302 atm.
    Temperature: 243° C.
    Reaction time: 6 hours Yield: 163.4 g.=96.5% of theory.

IR analysis for the crude product showed the following composition:
70% of theory. Methyl succinimide
20% of theory. Glutarimide
10% of theory. By-product Separation of the crude product followed by chromatography in an $Al_2O_3$ column with diethyl ether as eluant. The resultant components in the form of methyl succinimide and glutarimide correspond in weight to the IR analysis.

Melting point:
    65° C. (methyl succinimide)
    163° C. (glutarimide)
IR absorption:
    1075 cm.$^{-1}$
    925 cm.$^{-1}$ (characteristic of methyl succinimide)
    1132 cm.$^{-1}$ (characteristic of glutarimide)

*Analysis.*—Calculated: C=53.09; H=6.24; N=12.38. Found: C=53.12; H=6.31; N=12.27.

EXAMPLE XIV

*N-Methyl-α-Methyl Succinimide From N-Methyl Methacryl Amide*

Procedure as in Example I.
Starting materials: 79 g. of N-methyl methacryl amide (stabilized by the addition of some hydroquinone)—
100 ml. of benzene $Co_2(CO)_8$ solution.

Reaction conditions:
    Initial pressure: 170 atm. CO
    Final pressure: 300 atm.
    Temperature: 240° C.
    Reaction time: 4 hours Yield: 71.4 g.=70.2% of theory.

Boiling point (12 mm.): 111° C.
$n_{20}$=1.4763
IR carbonyl bonds: 1695 cm.$^{-1}$, 1765 cm.$^{-1}$

*Analysis.*—Calculated: C=56.68; H=7.14; N=11.02. Found: C=57.12; H=7.45; N=11.82.

EXAMPLE XV

*N-p-Chlorophenyl Succinimide From N-p-Chlorophenyl-Acryl Amide*

Procedure as in Example I.
Starting materials: 30 g. of N-p-chlorophenyl acryl amide (stabilized by the addition of some hydroquinone)—

150 ml. of acetone
25 ml. of benzene $Co_2(CO)_8$ solution

Reaction conditions:
  Initial pressure: 160 atm. CO
  Final pressure: 307 atm.
  Temperature: 240° C.
  Reaction time: 4 hours Yield: 22.2 g.=64.5% of theory.

Melting point: 167° C. (from methanol)
IR carbonyl bonds: 1705 $cm.^{-1}$, 1768 $cm.^{-1}$

*Analysis.*—Calculated: C=57.50; H=3.85; N=6.68; Cl=16.91. Found: C=57.12; H=3.99; N=6.75; Cl=17.29.

EXAMPLE XVI

*Hexahydro-Phthalic Acid Imide From Cyclohexene Carboxylic Acid Amide*

Procedure as in Example I.
Starting materials: 50 g. of cyclohexene carboxylic acid amide (stabilized by the addition of some hydroquinone)—

300 ml. of acetone
60 ml. of benzene $Co_2(CO)_8$ solution

Reaction conditions:
  Initial pressure: 170 atm. CO
  Final pressure: 300 atm.
  Temperature: 240° C.
  Reaction time: 6 hours Yield: 55.7 g.=91% of theory.

Melting point: 132° C. (sublimated)
IR carbonyl bonds: 1698 $cm.^{-1}$, 1753 $cm.^{-1}$

*Analysis.*—Calculated: C=62.72; H=7.24; N=9.14. Found: C=62.86; H=7.23; N=9.60.

EXAMPLE XVII

*(2-Carboxycyclohexyl)-Acetic Acid Imide From Cyclohexene Acetic Acid Amide*

Procedure as in Example I.
Starting materials: 50 g. of cyclohexene acetic acid amide (stabilized by the addition of some hydroquinone)—

300 ml. of benzene
50 ml. of benzene $Co_2(CO)_8$ solution

Reaction conditions:
  Initial pressure: 170 atm. CO
  Final pressure: 250 atm.
  Temperature: 240° C.
  Reaction time: 1¼ hours Yield: 24.6 g.=41% of theory.

Melting point: 185° C. (sublimated)
IR carbonyl bonds: 1670 $cm.^{-1}$, 1705 $cm.^{-1}$

*Analysis.*—Calculated: C=64.65; H=7.84; N=8.38. Found: C=64.93; H=7.81; N=8.17.

EXAMPLE XVIII

*α-Phenyl Succinimide From Cinnamic Acid Amide*

Procedure as in Example I.
Starting materials: 100 g. of cinnamic acid amide (stabilized by the addition of some hydroquinone)—

600 ml. of acetone
120 ml. of benzene $Co_2(CO)_8$ solution

Reaction conditions:
  Initial pressure: 190 atm. CO
  Final pressure: 310 atm.
  Temperature: 200° C.
  Reaction time: 1½ hours Yield: 37.7 g.=35% of theory.

Boiling point (0.2 mm.): 165° C.
IR carbonyl bonds: 1700 $cm.^{-1}$, 1700 $cm.^{-1}$

*Analysis.*—Calculated: C=68.56; H=5.18; N=8.00. Found: C=69.59; H=5.75; N=8.28.

EXAMPLE XIX

*β-Methyl Glutarimide From β,β-Dimethyl Acryl Amide*

Procedure as in Example I.
Starting materials: 83 g. of β,β-dimethyl acrylamide (stabilized by the addition of some hydroquinone)—

1200 ml. of benzene
90 ml. of benzene $Co_2(CO)_8$ solution

Reaction conditions:
  Initial pressure: 175 atm. CO
  Final pressure: 320 atm.
  Temperature: 218° C.
  Reaction time: 3 hours Yield: 71 g.=67% of theory.

According to the IR analysis the reaction product contains 65% of the theoretical amount of β-methyl glutarimide:
Melting point: 143° C.
IR carbonyl bonds: 1718 $cm.^{-1}$, 1775 $cm.^{-1}$.

*Analysis.*—Calculated: C=56.68; H=7.14; N=11.02. Found: C=56.69; H=7.33; N=11.01.

EXAMPLE XX

*α,α-Dimethyl Glutarimide From α,α-Dimethyl Vinyl Acetic Acid Amide*

Procedure as in Example I.
Starting materials: 50 g. of α,α-dimethyl vinyl acetic acid amide (stabilized by the addition of some hydroquinone)—

300 ml. of acetone
60 ml. benzene $Co_2(CO)_8$ solution

Reaction conditions:
  Initial pressure: 170 atm. CO
  Final pressure: 305 atm.
  Temperature: 222° C.
  Reaction time: 3½ hours Yield: 36 g.=58% of theory.

Boiling point (0.25 mm.): 105° C.
Melting point: 130° C. (from benzene/gasoline, sublimation)
IR carbonyl bonds: 1718 $cm.^{-1}$, 1761 $cm.^{-1}$

*Analysis.*—Calculated: C=59.55; H=7.85; N=9.92. Found: C=59.80; H=7.96; N=9.77.

Thus, this invention provides an effective process for the conversion with carbon monoxide (in the presence or absence of inert diluents) of α,β and β,γ unsaturated aliphatic carboxylic acids to cyclic imides of five to six atom rings, namely succinimides and glutarimides. In addition to the simple unsubstituted α,β- and β,γ-olefinically unsaturated aliphatic carboxylic acid amides, namely, acrylamide and but-3-enoic acid amide, corresponding amides with one or more substituents, free of active hydrogens, in the molecule are also useful. The substituent groups are preferably hydrocarbon, which may be saturated or unsaturated and aliphatic or aromatic, but halohydrocarbon groups, especially chlorohydrocarbon groups yield good results. Although the unsaturated acid amides in general will have from 3 to 20 carbon atoms with up to and including 3 substituent groups, they may contain more carbon atoms per molecule and have any molecular size as long as they are sufficiently soluble or fluid and stable under the reaction conditions. In addition to the compounds already mentioned, other suitable starting materials are:

N-(1-naphthyl) acryl amide,
N-(o-tolyl) acryl amide,
N-phenyl cinnamic acid amide, and
N-2-ethylhexyl acryl amide.

For simplicity, the unsaturated carboxylic acid amides can be represented by the formula:

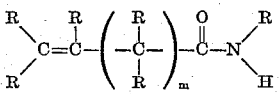

wherein $m$ is a whole number from zero to one, inclusive, and the R's are independently hydrogen or unreactive substituents, preferably selected from hydrogen and hydrocarbon groups, the number of non-hydrogen R's in a given molecule preferably being from zero to three and containing from 1 to 12 carbon atoms each. Two of the R's or the unsaturated C's may be replaced by another degree of unsaturation as in corresponding acetylenic amides.

We claim as our invention:

1. A process for preparing cyclic imides comprising reacting a carboxylic acid amide selected from the group consisting of α,β- and β,γ-mono-ethylenically unsaturated aliphatic carboxylic acid amides of from 3 to 20 carbon atoms and of the formula

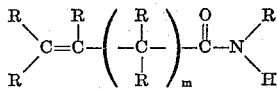

wherein $m$ is a whole number from 0 to 1, inclusive, and the R's are selected from the group consisting of hydrogen, hydrocarbon of 1 to 12 carbon atoms and chloro hydrocarbon of 1 to 12 carbon atoms, the number of non-hydrogen R's being from 0 to 3, with carbon monoxide at an elevated temperature and pressure in the presence of a cobalt carbonyl compound as catalyst.

2. A process according to claim 1 wherein the unsaturated carboxylic acid amide is acryl amide.

3. A process according to claim 1 wherein the unsaturated carboxylic acid amide is methacryl amide.

4. A process according to claim 1 wherein the unsaturated carboxylic acid amide is croton amide.

References Cited in the file of this patent

UNITED STATES PATENTS 2,958,695   Crowe et al. _____ Nov. 1, 1960